Aug. 10, 1926.
F. J. HEINRICH
BEARING PULLER
Original Filed Feb. 20, 1922   2 Sheets-Sheet 1
1,595,658
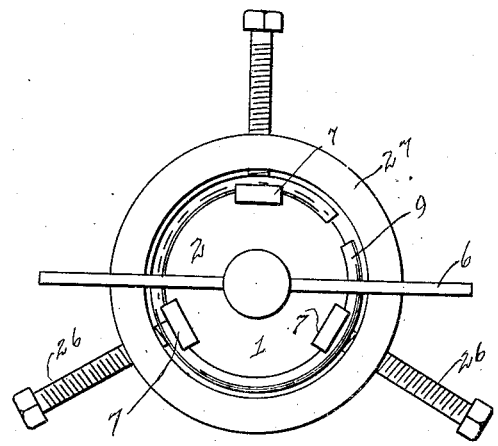
FIG. 2
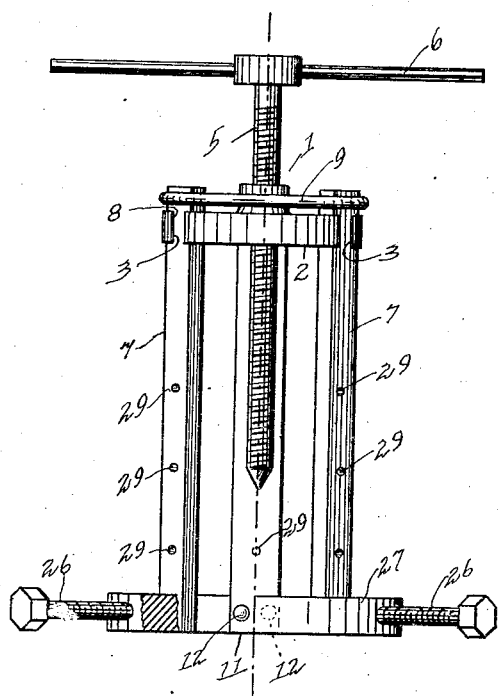
FIG. 1
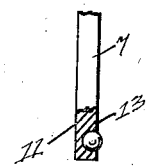
FIG. 3
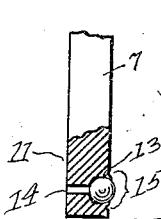
FIG. 4
FIG. 5
INVENTOR.
FRANK J. HEINRICH
BY
ATTORNEYS.

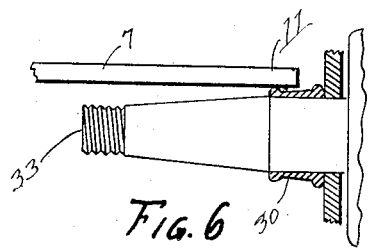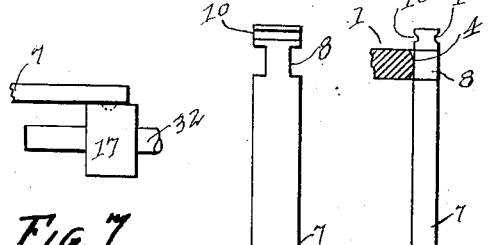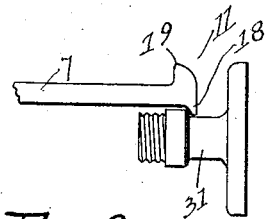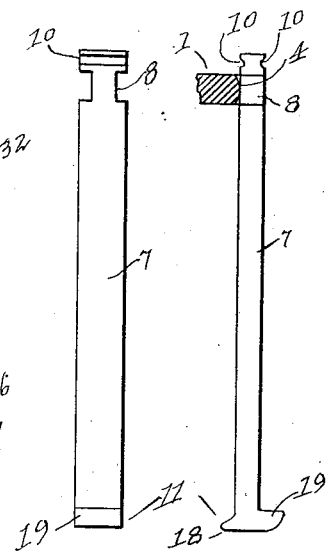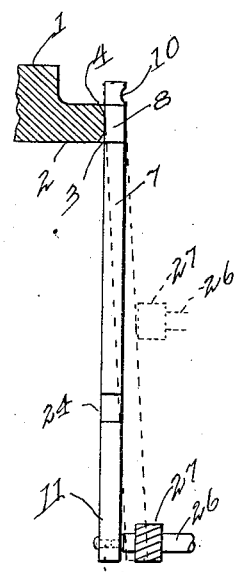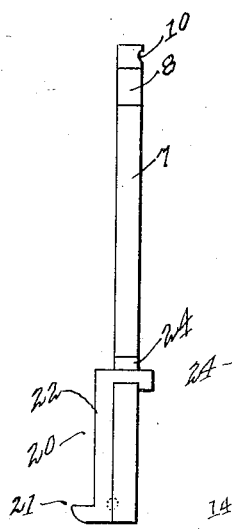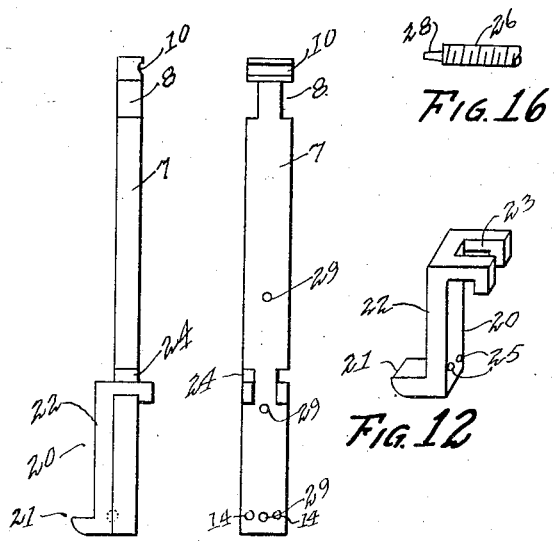

Patented Aug. 10, 1926.

1,595,658

UNITED STATES PATENT OFFICE.

FRANK J. HEINRICH, OF SPOKANE, WASHINGTON.

BEARING PULLER.

Application filed February 20, 1922, Serial No. 537,737. Renewed January 11, 1926.

This invention relates to pulling devices and is adapted more particularly for use about automobiles where the removal of hubs and bearings from shafts, cups of bearings from their seats, and the like, is imperative.

One object of the invention is to provide a means that, having interchangeable gripping members, may be adapted to withdraw a variety of sizes and shapes of tight fitting parts.

Another object of the invention is to provide a means for pulling hubs and the like, whose gripping members are yieldingly mounted in a head, that are detachable and reversible, and that may be readily replaced when necessary.

A further object of the invention is to provide a pulling means that is simple to construct, whose parts may be readily assembled manually and without rivets or bolts, and which is relatively cheap to manufacture.

With these and other objects in view reference is had to the accompanying drawings, in which—

Fig. 1 is a side elevation of the device, with parts broken away showing one form of gripping member;

Fig. 2 is a plan view of the device;

Fig. 3 is a sectional view of part of a gripping member, showing constructional details;

Fig. 4 is a similar view to Fig. 3;

Fig. 5 is a similar view to Fig. 3 but modified and enlarged;

Fig. 6 shows a gripping member applied to a cone of a Timken bearing;

Fig. 7 shows the application of a gripping member to a circular piece of work;

Fig. 8 is an end elevation of those parts shown in Fig. 7;

Fig. 9 shows a modified form of gripping member as applied to a hub of a wheel;

Fig. 10 is a front elevation of a modified form of gripping member;

Fig. 11 is a side elevation of a modified form of gripping member and its accommodating slot in the head;

Fig. 12 is a perspective view of an auxiliary foot;

Fig. 13 is a front view of a gripping member with auxiliary foot attached;

Fig. 14 is a side elevation of a gripping member showing auxiliary foot attached;

Fig. 15 is a side elevation of a gripping member showing one method of enlarging the scope of the work; and Fig. 16 is a side elevation of part of one of the gripping screws showing point for engaging gripping member.

Having reference to the drawings like numerals refer to like parts throughout the several views and the numeral 1 refers to the head of the device consisting preferably of a flat circular disc 2 provided with slots 3 in the periphery thereof, with the inner surface 4 of the slots curved vertically to present a convex face to the gripping member which will be presently explained.

Centrally positioned in the head is a means to exert endwise pressure on the element carrying the gripped bearing which consists of a pressure screw 5 in threaded engagement with the head and provided with a convenient handle 6 for operating said screw.

The gripping member 7 consists preferably of a rectangular bar provided with shouldered notches 8 at their upper ends, the notches being designed to register with the above mentioned notches 3 in the head, the curved surface 4 of which provides a rolling surface against which the gripping member is drawn by means of the spring 9 which is seated in the grooves 10 and against which the member is free to move in gripping or releasing a part to be drawn.

The gripping members are designed to project slightly above the head so that the tension of the spring attached to this part of the gripping member, will act to withdraw the lower end of the members radially away from the work, and to maintain the members assembled in the notches 3, and for this purpose obviously any form of spring may be used which is applicable to the purpose.

The gripping members may be removed from the head by removing the spring therefrom, and obviously the gripping members may be reversed, in which case grooves 10 will be provided in both sides of the member as shown in Fig. 11.

The gripping members terminate at their lower ends in feet 11 which may be of various forms best adapted to the work in hand, and these forms will now be described:

The ball foot consists of a pair of balls 12, seated in a recess 13 in the member. As this class of foot forms part of the subject matter of my former patent numbered 1,346,023, and dated July 6, 1920, I do not claim it as new, however this form is improved herein by providing an orifice 14 positioned in the gripping member directly behind the ball, and through which a suitable tool may be inserted to drive out a ball, when broken, or for any other cause. The balls are held in place by peening 15, (or upsetting) the metal around it as shown in Fig. 5.

The ball foot just described is applicable to pulling ball races by engaging the groove thereof; however it has been found by trial that the balls may be forced into a relatively softer metal and a firm grip obtained thereon. The pair of balls positioned adjacent to each other (see Fig. 1 in which one of the balls is shown dotted) provide a foot applicable to either straight or curved surfaces, such as are shown at 16 in Fig. 8 wherein the balls are shown firmly seated in the metal of a collar 17.

A second form of foot having two gripping means is shown in Figs. 9, 10 and 11, in which a small toe 18 is provided on the one side of the member 7 while a large toe 19 is provided on the opposite side. This foot is reversible and hence is provided with a double groove 10 to receive the spring with the foot in either position. Obviously the ball foot may be substituted for the large or small toe.

A third form of foot is a combination of the two above mentioned feet and consists of an auxiliary foot 20 having a toe 21 carried by the vertical plate 22 the upper end of which is forked 23; this fork is designed to engage the gripping member 7, as shown in Figs. 13 and 14 in the auxiliary notch 24 provided for the purpose. That the auxiliary foot may seat properly against the member 7 without interference with the projecting balls 11, recesses 25 are provided which are positioned therein to seat over these balls and thus provide a firm seat for the auxiliary foot.

It is now obvious that a ball foot may be changed to a foot having a toe if desired or when the nature of the work demands it.

To engage a bearing the gripping feet are forced against the bearing by means of the gripping screws 26 which are carried by the frame 27 positioned adjacent to the members 7, the screws and the frame cooperating to form a vice. The screws 26 are provided at their inner end with points 28 which engage the orifices 29 placed in the members 7 for the purpose and tends to stabilize the device and also to maintain with the spring 9 the assembly of the parts. Each member will contain a plurality of orifices by which means the frame 27 may be raised to a position shown by the dotted lines in Fig. 15 thus permitting greater expansion of the gripping members in extreme cases.

In use the device may be clamped to a bearing cone 30, as shown in Fig. 6, to a collar 17 as shown in Figs. 7 and 8, to a hub 31 as shown in Fig. 9, or to other devices of a like nature which may be pulled in this manner; the pressure screw 5 is then brought into engagement against the end of a shaft 32 or spindle 33, upon which the part has been driven, and then by forcing down this screw by means of the handle 6, the bearing is readily withdrawn.

All matter embraced herein that is covered by my former patent above mentioned, and by an application by me filed January 24, 1922, Serial No. 531,458, is hereby expressly disclaimed.

Having thus described my invention I claim—

1. In a bearing puller, in combination with a circular disc head provided with peripheral slots, a pressure screw in said head, and a frame carrying gripping screws, gripping members, provided with a plurality of gripping means on one end thereof, movably mounted in said slots, and a vertically curved surface in said slots against which said members seat.

2. In a bearing puller, in combination with a circular disc head provided with peripheral slots, a pressure screw in said head, and a frame carrying gripping screws, gripping members, provided with gripping means on one end thereof, movably mounted in said slots, said members provided with auxiliary slots, auxiliary feet mountable in said auxiliary slots and forming one of said gripping means, and a curved surface in said slots against which said members seat.

In testimony whereof I affix my signature.

FRANK J. HEINRICH.